United States Patent
Li

(10) Patent No.: US 12,299,767 B2
(45) Date of Patent: May 13, 2025

(54) INFORMATION ACQUISITION METHOD AND APPARATUS, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Zeen Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 192 days.

(21) Appl. No.: 18/115,125

(22) Filed: Feb. 28, 2023

(65) Prior Publication Data
US 2024/0095869 A1  Mar. 21, 2024

(30) Foreign Application Priority Data
Sep. 19, 2022 (CN) .......................... 202211139391.6

(51) Int. Cl.
*G06T 1/20* (2006.01)
*G06F 9/50* (2006.01)

(52) U.S. Cl.
CPC .............. *G06T 1/20* (2013.01); *G06F 9/5044* (2013.01)

(58) Field of Classification Search
None
See application file for complete search history.

(56) References Cited

U.S. PATENT DOCUMENTS

| | | | |
|---|---|---|---|
| 2021/0095529 A1* | 4/2021 | Gissler | E21B 33/0355 |
| 2022/0094690 A1* | 3/2022 | Tarkhanyan | G06F 9/505 |
| 2022/0164105 A1* | 5/2022 | Nowell | G06F 3/0659 |

OTHER PUBLICATIONS

Duval ("Use lspci on Linux to see your hardware"), Sep. 7, 2021 at https://opensource.com/article/21/9/lspci-linux-hardware (Year: 2021).*

* cited by examiner

*Primary Examiner* — Yanna Wu
(74) *Attorney, Agent, or Firm* — Brooks Kushman P.C.

(57) ABSTRACT

An information acquisition method and apparatus, an electronic device, and a storage medium are suggested, which relates to the field of artificial intelligence (AI) such as machine learning and distributed storage. The method may include: determining hardware devices located on a to-be-processed node in response to determining that a trigger condition is met; selecting an x processing unit (XPU) from the hardware devices; and acquiring predetermined information of the XPU by using a system management interface (SMI) management tool corresponding to the XPU, the predetermined information including model information of the XPU.

16 Claims, 5 Drawing Sheets

INFORMATION ACQUISITION METHOD AND APPARATUS, ELECTRONIC DEVICE, AND STORAGE MEDIUM

CROSS-REFERENCE TO RELATED APPLICATIONS

The present application claims the priority of Chinese Patent Application No. 202211139391.6, filed on Sep. 19, 2022, with the title of "INFORMATION ACQUISITION METHOD AND APPARATUS, ELECTRONIC DEVICE, AND STORAGE MEDIUM." The disclosure of the above application is incorporated herein by reference in its entirety.

FIELD OF THE DISCLOSURE

The present disclosure relates to the field of artificial intelligence (AI) technologies, and in particular to an information acquisition method and apparatus, an electronic device, and a storage medium in fields such as machine learning and distributed storage.

BACKGROUND OF THE DISCLOSURE

In a machine learning technology, generally, there is a need to first learn and train a corresponding machine model and then perform a reasoning test on the model. During the training and reasoning, a large number of calculations are involved. Correspondingly, various types of x processing units (XPUs), such as a graphic processing unit (GPU) and a tensor processing unit (TPU), have been developed to enhance computing power of machine learning.

Currently, training and reasoning tasks of machine learning are mostly deployed in a container-based Kubernetes cluster. Correspondingly, there is a need to acquire information such as models of the XPUs on nodes in the Kubernetes cluster, so as to provide the information to an upper-level service for distribution of computing power to finally complete an entire process of machine learning efficiently.

SUMMARY OF THE DISCLOSURE

The present disclosure provides an information acquisition method and apparatus, an electronic device, and a storage medium.

A method for information acquisition includes determining hardware devices located on a to-be-processed node in response to determining that a trigger condition is met; selecting an XPU from the hardware devices; and acquiring predetermined information of the XPU by using a system management interface (SMI) management tool corresponding to the XPU, the predetermined information including model information of the XPU.

An electronic device includes at least one processor; and a memory communicatively connected with the at least one processor; wherein the memory stores instructions executable by the at least one processor, and the instructions are executed by the at least one processor to enable the at least one processor to perform a method for information acquisition, wherein the method includes determining hardware devices located on a to-be-processed node in response to determining that a trigger condition is met; selecting an XPU from the hardware devices; and acquiring predetermined information of the XPU by using an SMI management tool corresponding to the XPU, the predetermined information including model information of the XPU.

A non-transitory computer readable storage medium with computer instructions stored thereon, wherein the computer instructions are used for causing a method for information acquisition, wherein the method includes determining hardware devices located on a to-be-processed node in response to determining that a trigger condition is met; selecting an x processing unit (XPU) from the hardware devices; and acquiring predetermined information of the XPU by using a system management interface (SMI) management tool corresponding to the XPU, the predetermined information including model information of the XPU.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the embodiments of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In addition, it should be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
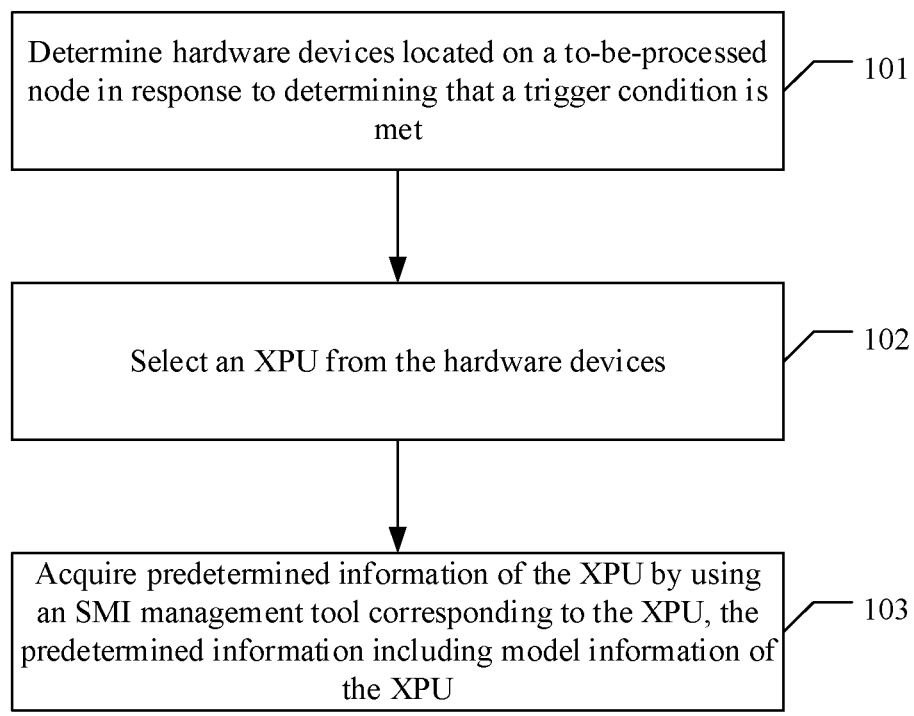
FIG. 1 is a flowchart of a first embodiment of a method for information acquisition according to the present disclosure.

FIG. 1 is a flowchart of a first embodiment of a method for information acquisition according to the present disclosure. As shown in FIG. 1, the following specific implementation is included.

In step 101, hardware devices located on a to-be-processed node are determined in response to determining that a trigger condition is met.

In step 102, an XPU is selected from the hardware devices.

In step 103, predetermined information of the XPU is acquired by using an SMI management tool corresponding to the XPU, the predetermined information including model information of the XPU.

Conventionally, information such as models of XPUs on nodes in a Kubernetes cluster is mainly acquired manually. In the case of a large number of nodes, a lot of manpower and time costs will be consumed, which is inefficient and error-prone.

By use of the solution in the above method embodiment, the information such as the models of the XPUs on the nodes can be acquired automatically, thereby saving manpower and time costs, improving processing efficiency and ensuring accuracy of processing results, etc.

Generally, one XPU may be deployed on one node, but a plurality of XPUs may also be deployed if necessary. Processing may be performed in the manner according to the present disclosure regardless of one or more XPUs.

In addition, in practical applications, the solution in the above method embodiment may be executed by an XPU-detector. The XPU-detector is a DaemonSet type application. Operation and maintenance personnel may deploy an XPU-detector on each node in the Kubernetes cluster in advance. That is, the operation and maintenance personnel may deploy the XPU-detector in the Kubernetes cluster in a DaemonSet manner through a Kubernetes package manager (helm). The DaemonSet manner means that an XPU-detector is deployed on each node in the cluster.

Correspondingly, each node in the Kubernetes cluster may be used as the to-be-processed node.

For the to-be-processed node, hardware devices located on the to-be-processed node may be determined in response to determining that a trigger condition is met.

In an embodiment of the present disclosure, the determining that a trigger condition is met may include: determining that the trigger condition is met in response to determining that a predetermined cycle duration has elapsed. A specific value of the cycle duration, such as 10 minutes or 1 hour, may be determined according to an actual requirement. That is, the process shown in FIG. 1 may be performed periodically for the to-be-processed node.

In practical applications, the XPU deployed on the node may change, such as change to an XPU with a different model. The above periodic processing can ensure that the acquired information is up-to-date, thereby further improving the accuracy of the acquired information, etc.

In an embodiment of the present disclosure, the hardware devices on the to-be-processed node may be acquired by calling a list peripheral component interconnect device information (lspci-vv) command. That is, all hardware devices on the to-be-processed node may be queried by calling the lspci-vv command.

lspci is the abbreviation of "list PCI", and PCI refers to Peripheral Component Interconnect. The queried hardware devices may include a memory, a network card, a central processing unit (CPU), and an XPU, etc.

It can be seen that, by means of the lspci-vv command, all the hardware devices on the to-be-processed node can be acquired efficiently and accurately, thereby laying a good foundation for subsequent processing.

After all the hardware devices on the to-be-processed node are acquired, an XPU can be selected from the hardware devices. That is, subsequent processing can be performed only for the XPU in the hardware devices.

Further, predetermined information of the XPU may be acquired by using an SMI management tool corresponding to the XPU, the predetermined information including model information of the XPU.

In an embodiment of the present disclosure, vendor identifications (IDs) of the hardware devices may be acquired respectively by calling the lspci-vv command. That is, the hardware devices on the to-be-processed node and the vendor IDs of the hardware devices may be acquired at the same time by calling the lspci-vv command. Correspondingly, the SMI management tool corresponding to the XPU may be acquired according to the vendor ID of the XPU.

A piece of data corresponding to each hardware devices may be acquired by calling the lspci-vv command, which may include vendor ID information of the corresponding hardware device. The vendor ID is unique and is configured to identify different vendors.

In addition, in an embodiment of the present disclosure, the SMI management tool corresponding to the XPU may be selected from a pre-saved management tool list according to the vendor ID of the XPU, and the management tool list includes different vendor IDs and SMI management tools corresponding thereto respectively.

In other words, SMI management tools adapted to various XPU vendors may be pre-integrated in the XPU-detector. In this way, for the selected XPU, the corresponding SMI management tool can be selected from the management tool list according to the vendor ID thereof.

In the above processing manner, the required SMI management tool can be acquired quickly and accurately, which is applicable to XPUs of any vendor and has wide applicability.

Predetermined information of the XPU may be acquired by using an SMI management tool corresponding to the XPU. In an embodiment of the present disclosure, firstly, text information corresponding to the XPU may be acquired by using the SMI management tool corresponding to the XPU. The text information includes introduction information of the XPU. Then, the predetermined information may be extracted from the text information by regular matching.

The text information may include various detailed introduction information about the XPU. The predetermined information may be extracted from the text information based on the text information by regular matching. An implementation of regular matching is simple and can ensure accuracy of an extraction result.

What information is specifically included in the predetermined information may be determined according to an actual requirement, which, for example, may also include video memory information corresponding to the XPU and the like in addition to the model information of the XPU. The video memory information may include a total amount, a usage amount, a remaining amount, and the like of a video memory.

In an embodiment of the present disclosure, the predetermined information may be recorded on the to-be-processed node.

For example, the model information of the XPU and the video memory information corresponding to the XPU may be recorded on the to-be-processed node. In addition, some other information, such as vendor ID information of the XPU, may also be further recorded.

Subsequently, the recorded information may be provided to an upper-level service for distribution of computing power, which can help the service to be quickly scheduled and deployed to a node with corresponding computing power, improving efficiency of the distribution of computing power, and reducing deployment time of the service, etc.

Figure 2:
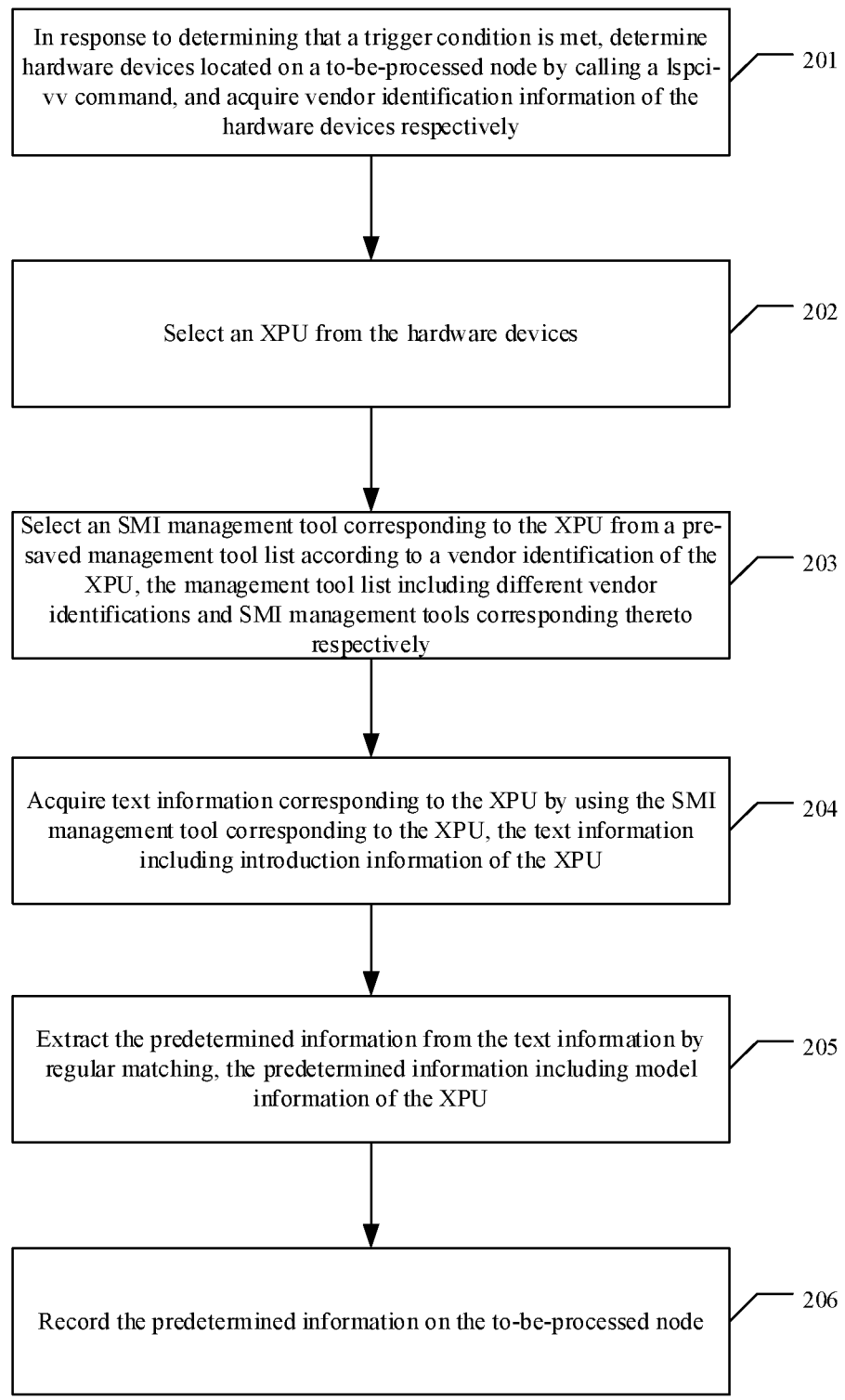
FIG. 2 is a flowchart of a second embodiment of a method for information acquisition according to the present disclosure.

In combination with the above introduction, FIG. 2 is a flowchart of a second embodiment of the method for information acquisition according to the present disclosure. As shown in FIG. 2, the following specific implementation is included.

In step 201, in response to determining that a trigger condition is met, hardware devices located on a to-be-processed node are determined by calling a lspci-vv command, and vendor ID information of the hardware devices is acquired respectively.

For example, each time a predetermined cycle duration has elapsed, it may be determined that the trigger condition is met, so as to perform the processing described in this embodiment.

In step 202, an XPU is selected from the hardware devices.

It is assumed that only one XPU is selected.

In step 203, an SMI management tool corresponding to the XPU is selected from a pre-saved management tool list according to a vendor ID of the XPU, the management tool list including different vendor IDs and SMI management tools corresponding thereto respectively.

That is, the SMI management tool corresponding to the XPU may be acquired according to the vendor ID information of the XPU.

In step 204, text information corresponding to the XPU is acquired by using the SMI management tool corresponding to the XPU, the text information including introduction information of the XPU.

In step 205, the predetermined information is extracted from the text information by regular matching, the predetermined information including model information of the XPU.

The predetermined information further includes video memory information corresponding to the XPU and the like. What information is specifically included is not limited.

In step 206, the predetermined information is recorded on the to-be-processed node.

For example, the model information of the XPU and the video memory information corresponding to the XPU may be recorded on the to-be-processed node. In addition, some other information, such as the vendor ID information of the XPU, may also be further recorded.

It is to be noted that, for the sake of brief description, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the actions and modules involved are not necessarily mandatory to the present disclosure. For a part that is not described in detail in one embodiment, refer to related descriptions in other embodiments.

In short, by use of the solution in the method embodiment of the present disclosure, the information such as the models of the XPUs on the nodes can be acquired automatically, thereby saving manpower and time costs, improving processing efficiency and ensuring accuracy of processing results. Moreover, the upper-level service can be helped to be quickly scheduled and deployed to a node with corresponding computing power, which improves efficiency of the distribution of computing power, and reduces deployment time of the service, etc.

The above is the introduction to the method embodiments. The following is a further illustration of the solutions of the present disclosure through apparatus embodiments.

Figure 3:
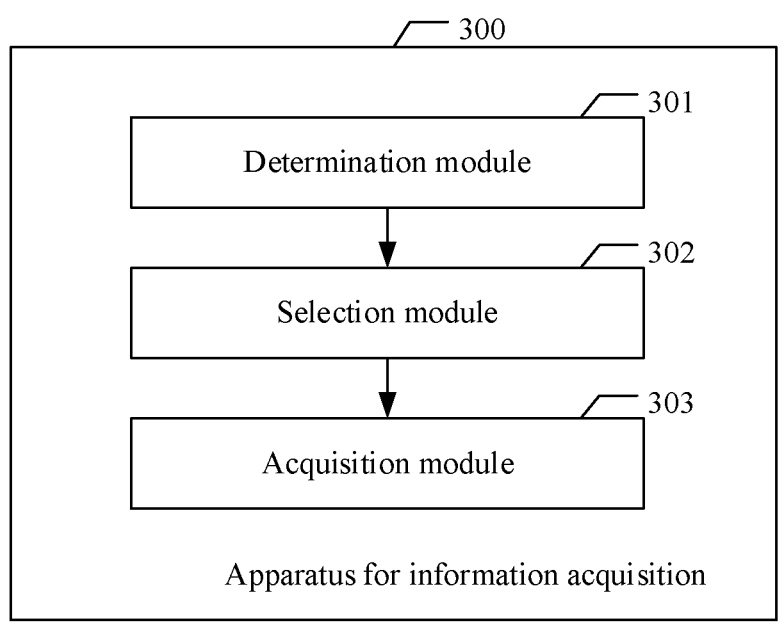
FIG. 3 is a schematic diagram of a composition structure of a first embodiment of an apparatus 300 for information acquisition according to the present disclosure.

FIG. 3 is a schematic diagram of a composition structure of a first embodiment of an apparatus 300 for information acquisition according to the present disclosure. As shown in FIG. 3, the apparatus includes: a determination module 301, a selection module 302, and an acquisition module 303.

The determination module 301 is configured to determine hardware devices located on a to-be-processed node in response to determining that a trigger condition is met.

The selection module 302 is configured to select an XPU from the hardware devices.

The acquisition module 303 is configured to acquire predetermined information of the XPU by using an SMI management tool corresponding to the XPU, the predetermined information including model information of the XPU.

By use of the solution in the above apparatus embodiment, the information such as models of XPUs on nodes can be acquired automatically, thereby saving manpower and time costs, improving processing efficiency and ensuring accuracy of processing results, etc.

In practical applications, each node in the Kubernetes cluster may be used as the to-be-processed node.

For the to-be-processed node, the determination module 301 may determine hardware devices located on the to-be-processed node in response to determining that a trigger condition is met.

In an embodiment of the present disclosure, the determining that a trigger condition is met may include: determining that the trigger condition is met in response to determining that a predetermined cycle duration has elapsed. A specific value of the cycle duration, such as 10 minutes or 1 hour, may be determined according to an actual requirement.

In an embodiment of the present disclosure, the determination module 301 may acquire the hardware devices on the to-be-processed node by calling a lspci-vv command. That is, all hardware devices on the to-be-processed node may be queried by calling the lspci-vv command.

The queried hardware devices may include a memory, a network card, a CPU, and an XPU, etc.

After all the hardware devices on the to-be-processed node are acquired, the selection module 302 may select an XPU from the hardware devices. That is, subsequent processing can be performed only for the XPU in the hardware devices.

Further, the acquisition module 303 may acquire predetermined information of the XPU by using an SMI management tool corresponding to the XPU, the predetermined information including model information of the XPU.

In an embodiment of the present disclosure, the determination module 301 may further acquire vendor IDs of the hardware devices respectively by calling the lspci-vv command. That is, the hardware devices on the to-be-processed node and vendor ID information of the hardware devices may be acquired at the same time by calling the lspci-vv command. Correspondingly, the acquisition module 303 may acquire the SMI management tool corresponding to the XPU according to the vendor ID information of the XPU.

A piece of data corresponding to each hardware devices may be acquired by calling the lspci-vv command, which may include vendor ID information of the corresponding hardware device. The vendor ID is unique and is configured to identify different vendors.

In addition, in an embodiment of the present disclosure, the acquisition module 303 may select the SMI management tool corresponding to the XPU from a pre-saved management tool list according to the vendor ID of the XPU, the management tool list including different vendor IDs and SMI management tools corresponding thereto respectively.

In other words, SMI management tools adapted to various XPU vendors may be pre-integrated in the management tool list. In this way, for the selected XPU, the corresponding SMI management tool can be selected from the management tool list according to the vendor ID thereof.

Predetermined information of the XPU may be acquired by using an SMI management tool corresponding to the XPU. In an embodiment of the present disclosure, the acquisition module 303 may first acquire text information corresponding to the XPU by using the SMI management tool corresponding to the XPU, the text information including introduction information of the XPU, and then extract the predetermined information from the text information by regular matching.

What information is specifically included in the predetermined information may be determined according to an actual requirement, which, for example, may also include video memory information corresponding to the XPU and the like in addition to the model information of the XPU. The video memory information may include a total amount, a usage amount, a remaining amount, and the like of a video memory.

Figure 4:
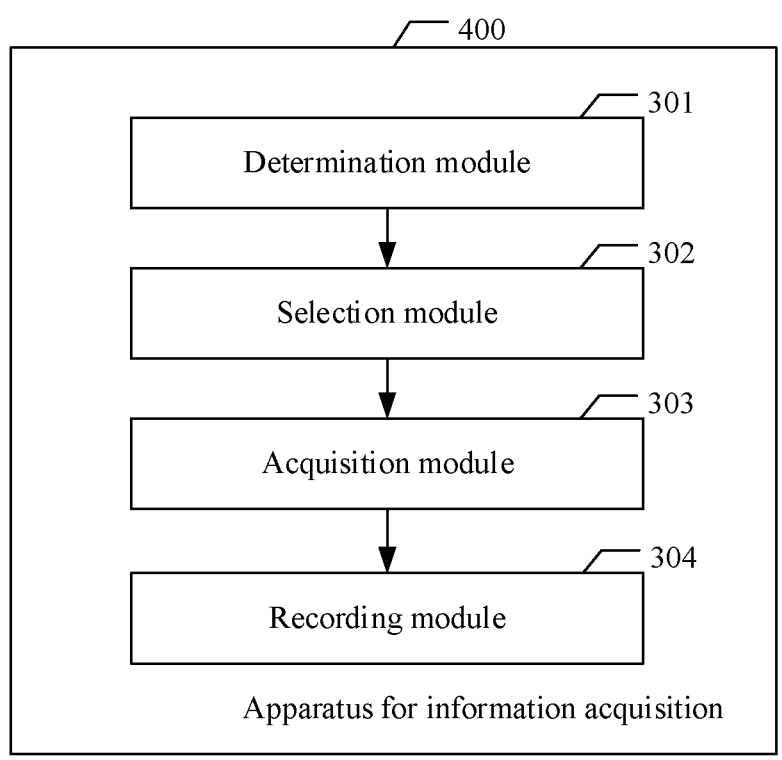
FIG. 4 is a schematic diagram of a composition structure of a second embodiment of an apparatus 400 for information acquisition according to the present disclosure.

FIG. 4 is a schematic diagram of a composition structure of a second embodiment of an apparatus 400 for information acquisition according to the present disclosure. As shown in FIG. 4, the apparatus includes: a determination module 301, a selection module 302, an acquisition module 303, and a recording module 304.

The determination module 301, the selection module 302, and the acquisition module 303 are the same as those in the embodiment shown in FIG. 3.

The recording module 304 is configured to record the acquired predetermined information on the to-be-processed node.

For example, the model information of the XPU and the video memory information corresponding to the XPU may be recorded on the to-be-processed node. In addition, some other information, such as vendor ID information of the XPU, may also be further recorded.

Specific operation flows of the apparatus embodiments shown in FIG. 3 and FIG. 4 may be obtained with reference to the related description in the above method embodiments. Details are not described again.

In short, by use of the solution in the apparatus embodiment of the present disclosure, the information such as the models of the XPUs on the nodes can be acquired automatically, thereby saving manpower and time costs, improving processing efficiency and ensuring accuracy of processing results. Moreover, the upper-level service can be helped to be quickly scheduled and deployed to a node with corresponding computing power, which improves efficiency of the distribution of computing power, and reduces deployment time of the service, etc.

The solutions of the present disclosure may be applied to the field of AI, and in particular, relates to fields such as machine learning and distributed storage. AI is a discipline that studies how to make computers simulate certain thinking processes and intelligent behaviors (such as learning, reasoning, thinking, and planning) of human beings, which includes hardware technologies and software technologies. The AI hardware technologies generally include sensors, dedicated AI chips, cloud computing, distributed storage, big data processing and other technologies. The AI software technologies mainly include a computer vision technology, a speech recognition technology, a natural language processing technology, machine learning/deep learning, a big data processing technology, a knowledge graph technology and other major directions.

Collection, storage, use, processing, transmission, provision, and disclosure of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 5:
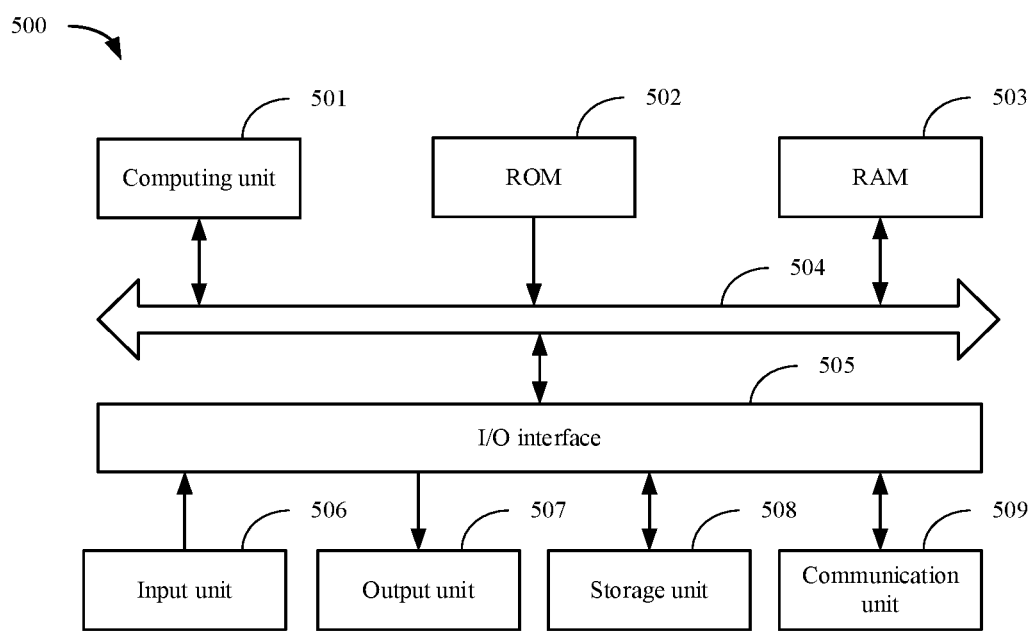
FIG. 5 is a schematic block diagram of an electronic device 500 configured to implement an embodiment of the present disclosure.

FIG. 5 is a schematic block diagram of an electronic device 500 configured to implement an embodiment of the present disclosure. The electronic device is intended to represent various forms of digital computers, such as laptops, desktops, workbenches, servers, blade servers, mainframe computers, and other suitable computers. The electronic device may further represent various forms of mobile devices, such as personal digital assistants, cellular phones, smart phones, wearable devices, and other similar computing devices. The components, their connections and relationships, and their functions shown herein are examples only, and are not intended to limit the implementation of the present disclosure as described and/or required herein.

As shown in FIG. 5, the device 500 includes a computing unit 501, which may perform various suitable actions and processing according to a computer program stored in a read-only memory (ROM) 502 or a computer program loaded from a storage unit 508 into a random access memory (RAM) 503. The RAM 503 may also store various programs and data required to operate the device 500. The computing unit 501, the ROM 502, and the RAM 503 are connected to one another by a bus 504. An input/output (I/O) interface 505 is also connected to the bus 504.

A plurality of components in the device 500 are connected to the I/O interface 505, including an input unit 506, such as a keyboard and a mouse; an output unit 507, such as various displays and speakers; a storage unit 508, such as disks and discs; and a communication unit 509, such as a network card, a modem and a wireless communication transceiver. The communication unit 509 allows the device 500 to exchange information/data with other devices over computer networks such as the Internet and/or various telecommunications networks.

The computing unit 501 may be a variety of general-purpose and/or special-purpose processing components with processing and computing capabilities. Some examples of the computing unit 501 include, but are not limited to, a central processing unit (CPU), a graphics processing unit (GPU), various AI computing chips, various computing units that run machine learning model algorithms, a digital signal processor (DSP), and any appropriate processor, controller or microcontroller, etc. The computing unit 501 performs the methods and processing described above, such as the method described in the present disclosure. For example, in some embodiments, the method described in the present disclosure may be implemented as a computer software program that is tangibly embodied in a machine-readable medium, such as the storage unit 508. In some embodiments, part or all of a computer program may be loaded and/or installed on the device 500 via the ROM 502 and/or the communication unit 509. One or more steps of the method described in the present disclosure may be performed when the computer program is loaded into the RAM 503 and executed by the computing unit 501. Alternatively, in other embodiments, the computing unit 501 may be configured to perform the method described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, the machine-readable medium may be tangible media which may include or store programs for use by or in conjunction with an instruction execution system, apparatus or device. The machine-readable medium may be a machine-readable signal medium or machine-readable storage medium. The machine-readable medium may include, but is not limited to, an electronic, magnetic, optical, electromagnetic, infrared, or semiconductor system, apparatus or device, or any suitable combinations thereof. More specific examples of a machine-readable storage medium may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein. The above specific implementations do not limit the scope of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the scope of protection of the present disclosure.

What is claimed is:

1. A method for information acquisition, comprising:
   determining hardware devices located on a to-be-processed node in response to determining that a trigger condition is met;
   selecting an x processing unit (XPU) from the hardware devices; and
   acquiring predetermined information of the XPU by using a system management interface (SMI) management tool corresponding to the XPU, the predetermined information comprising model information of the XPU,
   wherein the determining hardware devices located on a to-be-processed node comprises:
   acquiring the hardware devices located on the to-be-processed node by calling a list peripheral component interconnect device information (lspci-vv) command,
   wherein the method further comprising:
   acquiring vendor identifications of the hardware devices respectively by calling the lspci-vv command; and
   acquiring the SMI management tool corresponding to the XPU according to a vendor identification of the XPU.

2. The method according to claim 1, wherein the acquiring the SMI management tool corresponding to the XPU according to a vendor identification of the XPU comprises:

selecting the SMI management tool corresponding to the XPU from a pre-saved management tool list according to the vendor identification of the XPU, the management tool list comprising different vendor identifications and SMI management tools corresponding thereto respectively.

3. The method according to claim 2, further comprising: recording the predetermined information on the to-be-processed node.

4. The method according to claim 1, wherein the acquiring predetermined information of the XPU by using an SMI management tool corresponding to the XPU comprises:
acquiring text information corresponding to the XPU by using the SMI management tool corresponding to the XPU, the text information comprising introduction information of the XPU; and
extracting the predetermined information from the text information by regular matching.

5. The method according to claim 4, further comprising: recording the predetermined information on the to-be-processed node.

6. The method according to claim 1, further comprising: recording the predetermined information on the to-be-processed node.

7. The method according to claim 1, wherein
the determining that a trigger condition is met comprises:
determining that the trigger condition is met in response to determining that a predetermined cycle duration has elapsed.

8. The method according to claim 1, further comprising: recording the predetermined information on the to-be-processed node.

9. The method according to claim 1, further comprising: recording the predetermined information on the to-be-processed node.

10. An electronic device, comprising:
at least one processor; and
a memory communicatively connected with the at least one processor;
wherein the memory stores instructions executable by the at least one processor, and the instructions are executed by the at least one processor to enable the at least one processor to perform a method for information acquisition, wherein the method comprises:
determining hardware devices located on a to-be-processed node in response to determining that a trigger condition is met;
selecting an XPU from the hardware devices; and
acquiring predetermined information of the XPU by using an SMI management tool corresponding to the XPU, the predetermined information comprising model information of the XPU,
wherein the determining hardware devices located on a to-be-processed node comprises:
acquiring the hardware devices located on the to-be-processed node by calling a list peripheral component interconnect device information (lspci-vv) command,
wherein the method further comprising:
acquiring vendor identifications of the hardware devices respectively by calling the lspci-vv command; and
acquiring the SMI management tool corresponding to the XPU according to a vendor identification of the XPU.

11. The electronic device according to claim 10, wherein the acquiring the SMI management tool corresponding to the XPU according to a vendor identification of the XPU comprises:
selecting the SMI management tool corresponding to the XPU from a pre-saved management tool list according to the vendor identification of the XPU, the management tool list comprising different vendor identifications and SMI management tools corresponding thereto respectively.

12. The electronic device according to claim 10, wherein the acquiring predetermined information of the XPU by using an SMI management tool corresponding to the XPU comprises:
acquiring text information corresponding to the XPU by using the SMI management tool corresponding to the XPU, the text information comprising introduction information of the XPU; and extracting the predetermined information from the text information by regular matching.

13. The electronic device according to claim 10, further comprising:
recording the predetermined information on the to-be-processed node.

14. The electronic device according to claim 10, wherein the determining that a trigger condition is met comprises:
determining, in response to determining that a predetermined cycle duration has elapsed, that the trigger condition is met.

15. The electronic device according to claim 10, further comprising:
recording the predetermined information on the to-be-processed node.

16. A non-transitory computer readable storage medium with computer instructions stored thereon, wherein the computer instructions are used for causing a method for information acquisition, wherein the method comprises:
determining hardware devices located on a to-be-processed node in response to determining that a trigger condition is met;
selecting an x processing unit (XPU) from the hardware devices; and
acquiring predetermined information of the XPU by using a system management interface (SMI) management tool corresponding to the XPU, the predetermined information comprising model information of the XPU,
wherein the determining hardware devices located on a to-be-processed node comprises:
acquiring the hardware devices located on the to-be-processed node by calling a list peripheral component interconnect device information (lspci-vv) command,
wherein the method further comprising:
acquiring vendor identifications of the hardware devices respectively by calling the lspci-vv command; and
acquiring the SMI management tool corresponding to the XPU according to a vendor identification of the XPU.

* * * * *